United States Patent Office 2,745,821
Patented May 15, 1956

2,745,821

ACRYLONITRILE POLYMERS STABILIZED WITH CERTAIN ALKYL ESTERS OF THIOGLYCOLIC ACID

George W. Stanton and Forrest A. Ehlers, Walnut Creek, Calif., assignors to The Dow Chemical Company, Midland, Mich., a corporation of Delaware No Drawing. Application September 4, 1952,
Serial No. 307,920

5 Claims. (Cl. 260—45.85)

This invention relates to compositions of matter consisting essentially of a polymer containing at least 60 per cent of acrylonitrile in the polymer molecule, and a stabilizing agent to protect the polymer from the embrittling or discoloring effects of exposure to light or heat.

Polyacrylonitrile and copolymers containing acrylonitrile as the predominant constituent undergo undesirable physical changes upon prolonged exposure to light or to heat. The observable symptoms of such changes are embrittlement or discoloration, or both, due, in varying measure to the action of either light or heat. Since the uses to which such polymers are put include the manufacture of molded articles and thin films, either embrittlement or discoloration is to be avoided, if possible. To this end, it would be desirable to provide agents which can be admixed with the polymers to protect them against one or more of the adverse effects of the conditions to which they may be exposed. The provision of stabilized compositions of the polymers and such protective agents is the principal object of the present invention.

This object is realized, according to the invention, by mixing with the polymer from 1 to 20 per cent, and preferably from 5 to 15 per cent by weight of an alkyl ester of thioglycolic acid wherein the alkyl group contains from 1 to 5 carbon atoms. Articles made from the resulting compositions show little or no tendency to discolor upon prolonged exposure to ultraviolet light, and exhibit little of the tendency to become brittle as a result of such exposure, especially when the stabilizer is present at concentrations of 5 per cent or more.

A copolymer of 80 per cent acrylonitrile and 20 per cent isobutylene was prepared in aqueous emulsion, the polymeric particles were coagulated by addition of magnesium chloride solution, and the coagulum was washed and dried. This copolymer was found to be soluble to the extent of over 15 per cent by weight in acetone. In evaluating the various stabilizers, a 15 per cent solution of the copolymer in acetone was prepared, an amount of stabilizer equal to 15 per cent of the weight of copolymer was dissolved in the solution, and films were cast from the solution on glass plates. The films were dried in air overnight, then at 70° C. for one hour. The resulting films were mounted near the rim of a horizontal turntable, with half of the film covered and the other half exposed. The turntable was set in motion in a Fadeometer, and the exposed films were irradiated for 120 hours. The several films were then tested with a photoelectric reflection meter which had been set to read 100 when turned toward a glazed white tile (see footnote). An exposed but untreated film of the copolymer gave readings of about 70 and had a light tan color, while the covered and unexposed portions of all the films gave readings of 90 to 96, using the white tile standard as a background.

Results with typical compounds in the recited class are given below:

| Test Compound | Reflection meter reading after 120 hrs. in Fadeometer |
|---|---|
| (Stabilizers): | |
| None | About 70. |
| Ethyl thioglycolate | about 89. |
| Butyl thioglycolate | about 80. |
| Amyl thioglycolates | about 89. |

NOTE.—In the Fadeometer employed, two type S-4 General Electric Sunlight lamps are disposed horizontally and parallel to one another, with the centers of the bulbs 4 inches apart, at a height 5.75 inches above, and displaced 6 inches from the center of a 12-inch turntable driven at 33⅓ revolutions per minute. The reflection meter used is a Model 610, made by the Photovolt Corporation, 95 Madison Ave., New York city, having a tristimulus blue filter and set to read 100 when turned toward a color-standard white ceramic "Vitrolite" tile supplied by Gardner Laboratories, Bethesda, Maryland.

The amyl ester reported above was prepared from a mixed amyl alcohol and the precise proportions of the various 5-carbon atom groups is not known.

Tests have shown that a beneficial effect is obtained with amounts of 1 per cent or more of the thioglycolates in the acrylonitrile-containing polymers and that the polymeric body is almost entirely free from embrittlement due to light when as much as 5 per cent of the ester is employed. It is unnecessary to use over 20 per cent of the ester, and quantities greater than 15 per cent afford little if any additional protection to the polymer.

The described effect is not limited to the particular copolymer of the examples, nor to the specific esters tested, as any of the defined esters may be used with success in compositions based on polyacrylonitrile or any thermoplastic copolymer containing 60 per cent or more of acrylonitrile, including but not limited to such copolymers as contain vinyl chloride, vinyl acetate, methyl and other alkyl acrylates or methacrylates, the vinyl pyridines, allyl alcohol, and many others.

We claim:

1. A composition of matter the essential constituents of which are a polymeric body containing at least 60 per cent by weight of acrylonitrile polymerized in the polymer molecule, any balance being another monoethylenically unsaturated compound copolymerized with acrylonitrile, and, as a stabilizing agent therefor, from 1 to 20 per cent by weight of an alkyl ester of thioglycolic acid in which the alkyl group is from the class consisting of the ethyl, butyl and amyl radicals.

2. The composition claimed in claim 1, wherein the stabilizing agent is ethyl thioglycolate.

3. The composition claimed in claim 1, wherein the stabilizing agent is a butyl thioglycolate.

4. The composition claimed in claim 1, wherein the stabilizing agent is an amyl thioglycolate.

5. The composition claimed in claim 1, wherein the stabilizing agent is present in amount of 5 to 15 per cent of the weight of the polymer.

References Cited in the file of this patent

UNITED STATES PATENTS 2,530,852    Bixby _____ Nov. 21, 1950